US006259436B1

(12) United States Patent
Moon et al.

(10) Patent No.: US 6,259,436 B1
(45) Date of Patent: Jul. 10, 2001

(54) APPARATUS AND METHOD FOR DETERMINING SELECTION OF TOUCHABLE ITEMS ON A COMPUTER TOUCHSCREEN BY AN IMPRECISE TOUCH

(75) Inventors: Billy G. Moon, Apex; Mona Singh, Cary, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/219,207

(22) Filed: Dec. 22, 1998

(51) Int. Cl.[7] .................................................. G09G 5/00
(52) U.S. Cl. ......................... 345/173; 345/179; 345/146
(58) Field of Search .................................. 345/173, 179, 345/113, 115, 145, 146; 340/407.1, 407.2; 178/18.01, 18.02

(56) References Cited

U.S. PATENT DOCUMENTS

| 4,698,625 | * | 10/1987 | McCaskill et al. | 345/157 |
| 5,748,512 | * | 5/1998 | Vargas | 708/142 |
| 5,757,358 | | 5/1998 | Osga . | |
| 5,805,157 | | 9/1998 | Bertram et al. . | |
| 6,023,265 | * | 2/2000 | Lee | 345/173 |
| 6,040,824 | * | 3/2000 | Maekawa et al. | 345/173 |

FOREIGN PATENT DOCUMENTS

| 0 476 972 A2 | 3/1992 | (EP) . |
| 0 822 529 A1 | 2/1998 | (EP) . |

OTHER PUBLICATIONS

"Proximity Detector For Mouse Cursor," IBM Technical Disclosure Bulletin, vol. 33, No. 8, pp. 253–254 (Jan. 1991).

* cited by examiner

Primary Examiner—Richard Hjerpe
Assistant Examiner—Alexander Eisen
(74) Attorney, Agent, or Firm—Davidson & Gribbell, LLP (57) ABSTRACT

An apparatus and method of determining which touchable item depicted on a computer touchscreen to select for an imprecise touch, including the steps of identifying all potentially selected touchable items for the imprecise touch, calculating a probability of intended selection for each potentially selected touchable item, and selecting the potentially selected touchable item having the greatest calculated probability of intended selection. It will be seen that the identifying step includes determining which touchable items depicted on the computer touchscreen overlap with the imprecise touch. The probability calculating step is a function of a distance between a centerpoint of the imprecise touch and a centerpoint for each potentially selected touchable item and/or a function of an overlap area between the imprecise touch and each potentially selected touchable item. The selecting step further includes comparing the calculated probability of intended selection for each potentially selected touchable item and determining whether the potentially selected touchable item having the greatest calculated probability of intended selection is greater than the calculated probability of intended selection for the potentially selected touchable items by a predetermined amount.

59 Claims, 7 Drawing Sheets

APPARATUS AND METHOD FOR DETERMINING SELECTION OF TOUCHABLE ITEMS ON A COMPUTER TOUCHSCREEN BY AN IMPRECISE TOUCH

BACKGROUND OF THE INVENTION

1. Field of the Invention

The present invention relates generally to the selection of touchable items depicted on a computer-controlled touchscreen display and, more particularly, to an apparatus and method for determining which touchable item is selected by an imprecise touch.

2. Description of Related Art.

Various types of computer-based devices have been developed for communications, information processing and other purposes. Among these devices are personal computers, personal digital assistants, and a relatively new class of devices known as portable intelligent communications devices. Unlike the first two devices, the portable intelligent communications device is designed extensively to be a communications device, rather than just a mobile computer, and as such it includes a computer integrated with communications hardware and software to provide telephony, messaging and information services. To enable at least some of these features, the portable intelligent communications device is able to be connected to the Internet by either a wired link or a wireless link.

It will also be understood that certain software applications are provided within the portable intelligent communications device which facilitate the aforementioned features, as well as other desirable features such as a Personal Information Manager (PIM), games and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

As noted in another related patent application entitled "Apparatus And Method Of Formatting A List For Display On A Touchscreen," having Ser. No. 09/083,012 and also being owned by the assignee of the present invention, the portable intelligent communications device preferably employs a touchscreen in conjunction therewith. It will be understood that a number of touchable items are displayed on the touchscreen which activate certain functions associated therewith when touched by a user. By "touchable item," it is meant any icon, symbol, designation, or other representation, either graphic and/or text in nature, which causes a related action or function to take place when touched (e.g., a graphical user interface).

It will be appreciated that each touchable item is preferably configured so as to have a defined target area therefor. This target area typically does not encompass the total area displayed for a touchable item, but has a predetermined shape and dimension. It is only when this predefined target area is touched by a user that the function or action associated with the touchable item is actually activated.

Although natural, touchscreens run a high risk of leading to errors. One reason for such errors is inherent inaccuracies from users touching with their fingers instead of a stylus. Another reason is that touchscreens on devices like the portable intelligent communications device described above are relatively small and the touchable items depicted thereon must be positioned closely together in order to present the information necessary for the given applications.

One approach to solving this problem has been the insertion of a cutout into a touchscreen as disclosed in U.S. Pat. No. 5,572,573 to Sylvan et al. As seen therein, the user of such touchscreen must press within the cutout regions because the insert covers the rest of the touchscreen real estate. It has been found, however, that this approach is highly inconvenient when more than one application is utilized on the touchscreen or when the display for a given application is apt to change dynamically. Since this approach also effectively reduces the size of the touchscreen by separating out the touchable areas with pieces of cardboard or plastic, it is seen that having the ability to perform a precise touch is countered by the efficient use of touchscreen real estate.

Accordingly, it is a primary object of the present invention to provide an apparatus and method for selecting a touchable item displayed on a computer-controlled touchscreen which improves the effectiveness of user interactions thereon without requiring a touch to become more precise.

It is another object of the present invention to provide an apparatus and method for selecting a touchable item displayed on a computercontrolled touchscreen which improves the effectiveness of user interactions thereon without requiring the touchscreen to become bigger.

It is still another object of the present invention to provide an apparatus and method for selecting a touchable item displayed on a computer-controlled touchscreen which improves the effectiveness of user interactions thereon without requiring a user to employ a stylus.

Yet another object of the present invention is to provide an apparatus and method for determining an intended touchable item on a computer-controlled touchscreen for selection from an imprecise touch.

Another object of the present invention is to provide an apparatus and method for selecting a touchable item displayed on a computer-controlled touchscreen which reduces errors caused by imprecise touches.

Still another object of the present invention is to provide an apparatus and method for selecting a touchable item displayed on a computer-controlled touchscreen which varies the threshold difference between touchable items based on the type of action and/or the specific application associated with such touchable items.

These objects and other features of the present invention will become more readily apparent upon reference to the following description when taken in conjunction with the following drawings.

SUMMARY OF THE INVENTION

In accordance with a first aspect of the present invention, a method of determining which touchable item depicted on a computer touchscreen to select for an imprecise touch is disclosed as including the steps of identifying all potentially selected touchable items for the imprecise touch, calculating a probability of intended selection for each potentially selected touchable item, and selecting the potentially selected touchable item having the greatest calculated probability of intended selection. It will be seen that the identifying step includes determining which touchable items depicted on the computer touchscreen overlap with the imprecise touch. The probability of intended selection is a function of a distance between a centerpoint of the imprecise touch and a centerpoint for each potentially selected touchable item and/or a function of an overlap area between the imprecise touch and each potentially selected touchable item. The selecting step further includes comparing the calculated probability of intended selection for each potentially selected touchable item and determining whether the potentially selected touchable item having the greatest calculated probability of intended selection is greater than the calculated probability of intended selection for the other potentially selected touchable items by a predetermined amount.

In accordance with a second aspect of the present invention, a method of discriminating among a plurality of touchable items displayed on a touchscreen of a computer system having a memory circuit, a processing circuit and a touchscreen is disclosed for a touch overlapping at least two touchable items. The method includes the steps of calculating an area of overlap between the touch and each touchable item and selecting the touchable item having the greatest overlap area with the touch. This method further includes the steps of calculating a distance between a centerpoint of the touch and a centerpoint of each touchable item to determine a first value, calculating a relative overlap for each touchable item by dividing the area of overlap by a total area for each touchable item to determine a second value, dividing the second value by the first value for each touchable item to determine a third value, and normalizing the third value for each touchable item by dividing the third value by a total value for all touchable items. Alternatively, the method can include the steps of calculating a relative overlap area for each touchable item by dividing the area of overlap by a total area for each touchable item to determine a first value, squaring the relative overlap area for each touchable item to determine a second value, and normalizing the second value for each touchable item by dividing the second value by a total value for all touchable items.

In accordance with a third aspect of the present invention, a portable intelligent communications device is disclosed as including circuitry for performing telephony operations, a memory circuit for storing a plurality of touchable items representative of certain functions of the portable intelligent communications device, a touchscreen for displaying the touchable items, and a processing circuit for determining which touchable item displayed on the touchscreen to select for an imprecise touch according to a probability of intended selection for each potentially selected touchable item.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
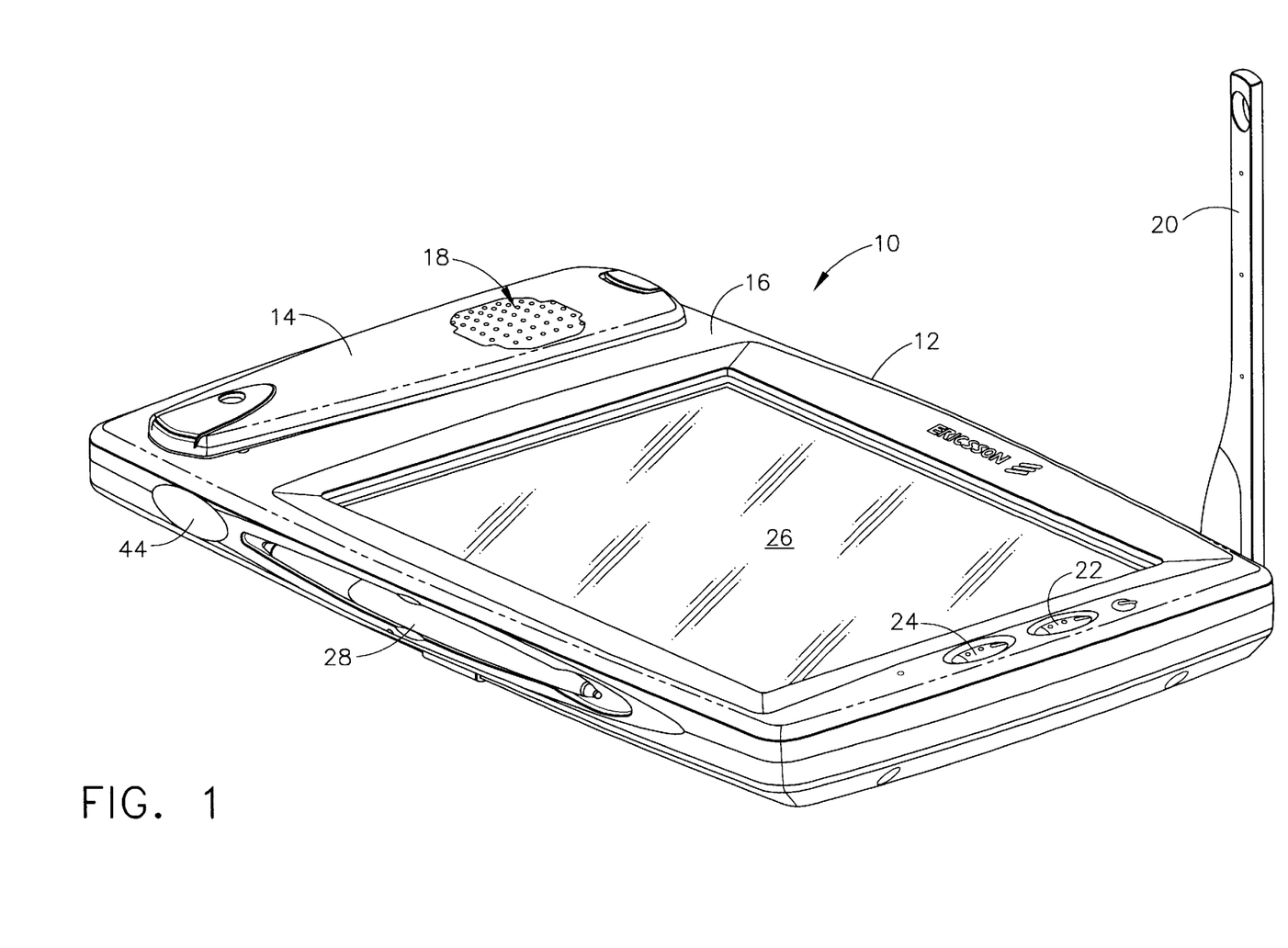
FIG. 1 is a perspective view of a portable intelligent communications device having a touchscreen in accordance with the present invention.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device, and includes circuitry and components which allow it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software, particularly where connection to an Internet address is desired. In this regard, it will be understood that portable intelligent communications device 10 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained therein. A pivotable antenna 20 (shown in FIG. 1 in the open or use position) is provided to enable a communications function, as when portable intelligent communications device 10 is in a cellular mode of operation. It will be understood that various ports, jacks, and interfaces will be provided to further enable communications functions by portable intelligent communications device 10. Control buttons 22 and 24 are also shown as being located on top portion 16 of casing 12.

Portable intelligent communications device 10 further includes a display screen 26, which preferably is a touchscreen. It will be appreciated that a stylus 28 may optionally be utilized to indicate a particular area more specifically than can be accomplished with the user's finger, although most designated areas, defined herein as target areas, are sized for touch interaction by a typically sized finger. Since portable intelligent communications device 10 preferably is no larger than a standard business desk telephone, display screen 26 is sized to be approximately eight (8) inches measured diagonally across. This puts touchscreen 26 in a distinct size class, as it is smaller than normal monitor sizes for personal and portable computers and larger than screen displays for personal digital assistants (PDAs), calculators, and other similar personal electronic devices.

Figure 2:
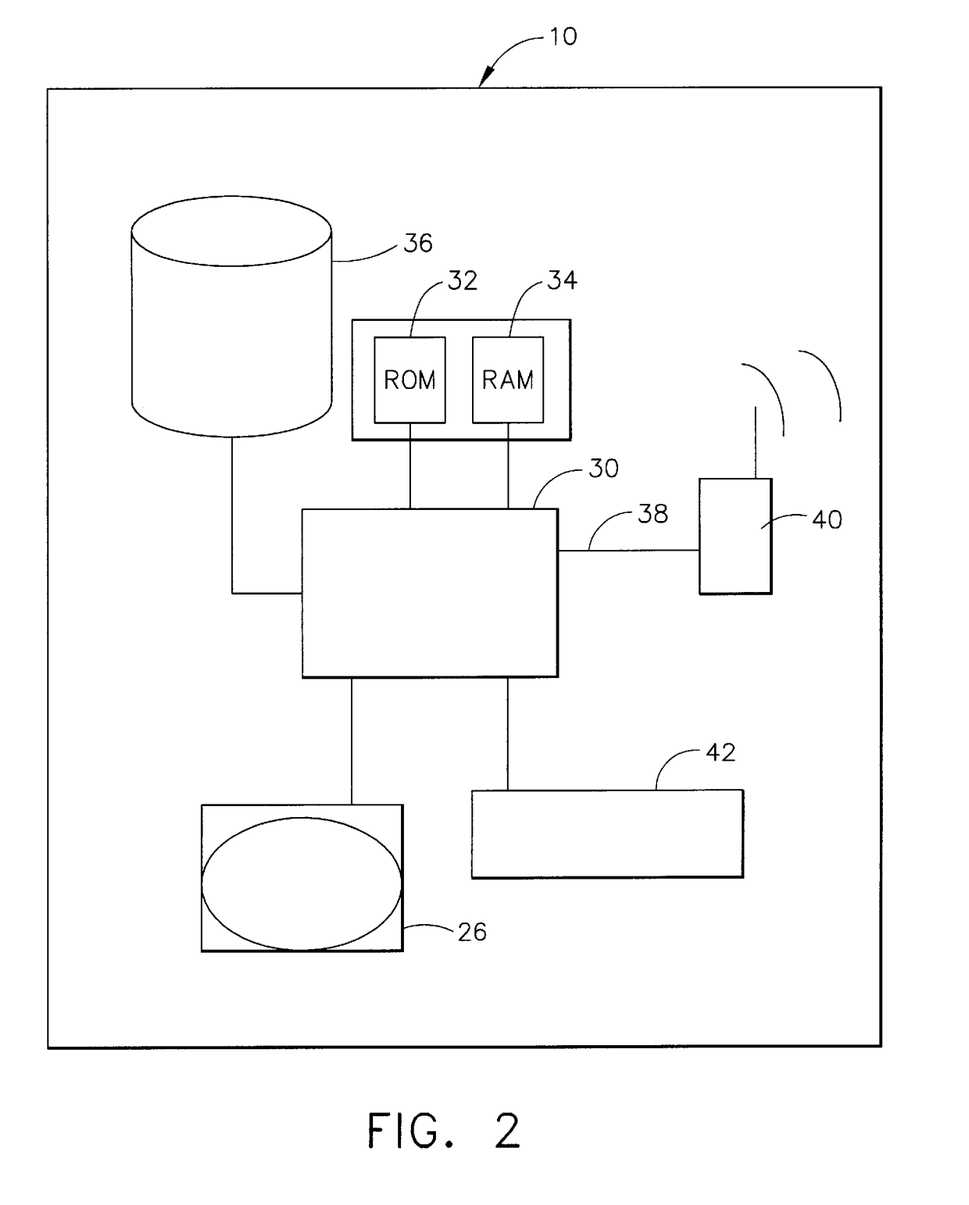
FIG. 2 is a block diagram of the major components of the portable intelligent communications device depicted in FIG. 1.

Turning to FIG. 2, the internal circuitry of portable intelligent communications device 10 includes a processing circuit 30, which may, for example, be a Motorola microprocessor known by the designation Power PC 821. It will be seen that processing circuit 30 is connected to both Read Only Memory (ROM) 32 and Random Access Memory (RAM) 34, which store both operating systems and software applications. An optional bulk storage device 36 is further provided for storing databases. Processing circuit 30 is also coupled to display screen 26 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 30 via a serial and/or parallel port 38 to the particular circuitry of a communications mode designated generically by reference numeral 40. As noted hereinabove, there are several communication mode options available, including cellular, landline, IrDA, and phone cards, and it will be appreciated that more than one such option may be utilized at a given time. A keyboard 42 may also be connected to processing circuit 30, where keyboard 42 can be depicted on display screen 26 or be a separate physical package which can be utilized with portable intelligent communications device 10 such as through a keyboard IR port 44 (see FIG. 1).

Figure 3:
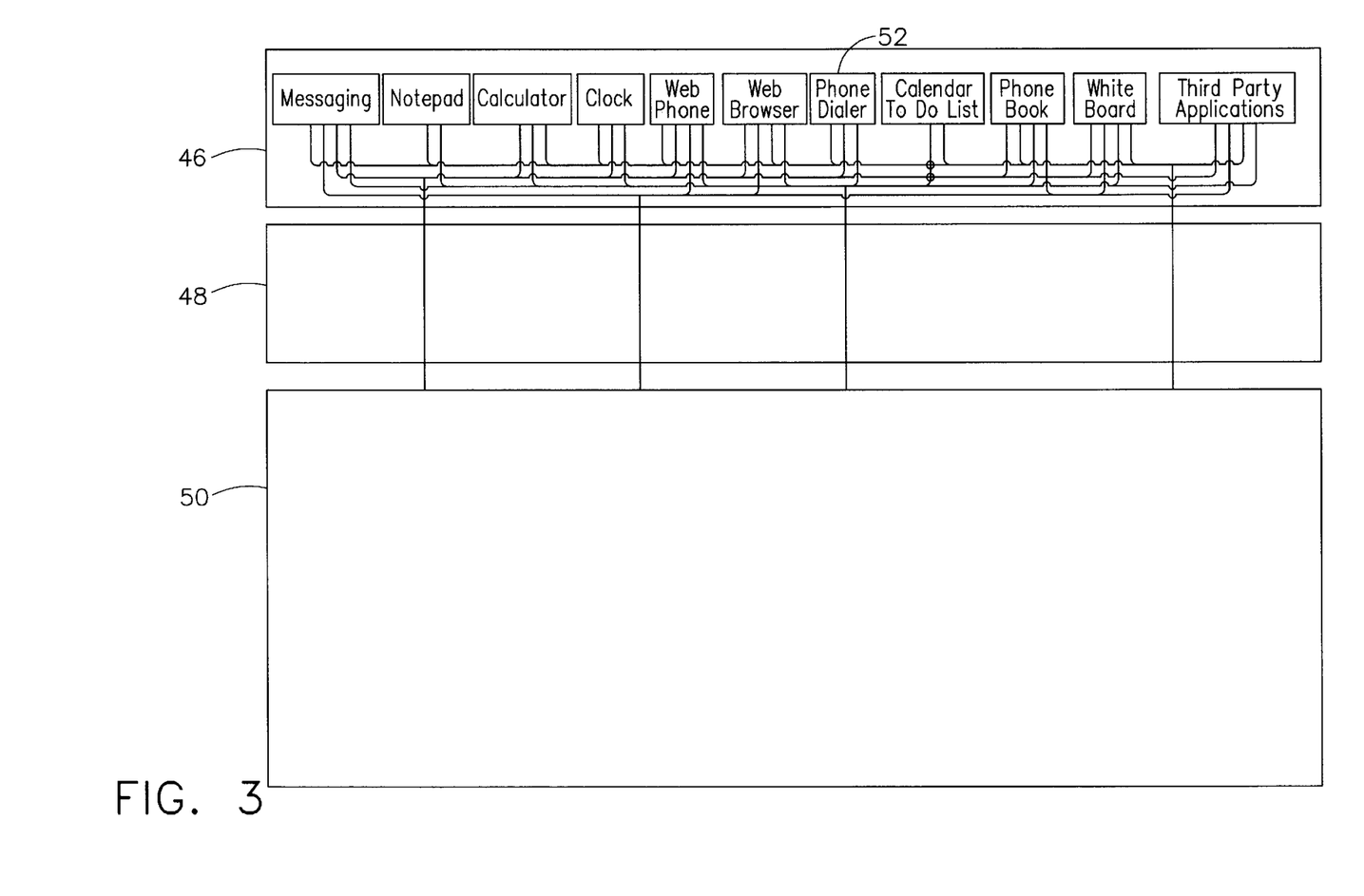
FIG. 3 is a block diagram of the software architecture for the portable intelligent communications device depicted in FIGS. 1 and 2.

FIG. 3 depicts a schematic block diagram of the software architecture for portable intelligent communications device 10. As seen therein, the software is divided into three basic areas: applications software 46, desktop software 48, and system operating software 50 (which includes everything else from the class libraries down to the device drivers for portable intelligent communications device 10). It will be understood that neither applications software 46 nor desktop software 48 will ever interact with anything other than the top layer of system operating software 50. Exemplary software applications, including one identified as Phone Dialer 52, are shown within applications software 46.

Figure 4:
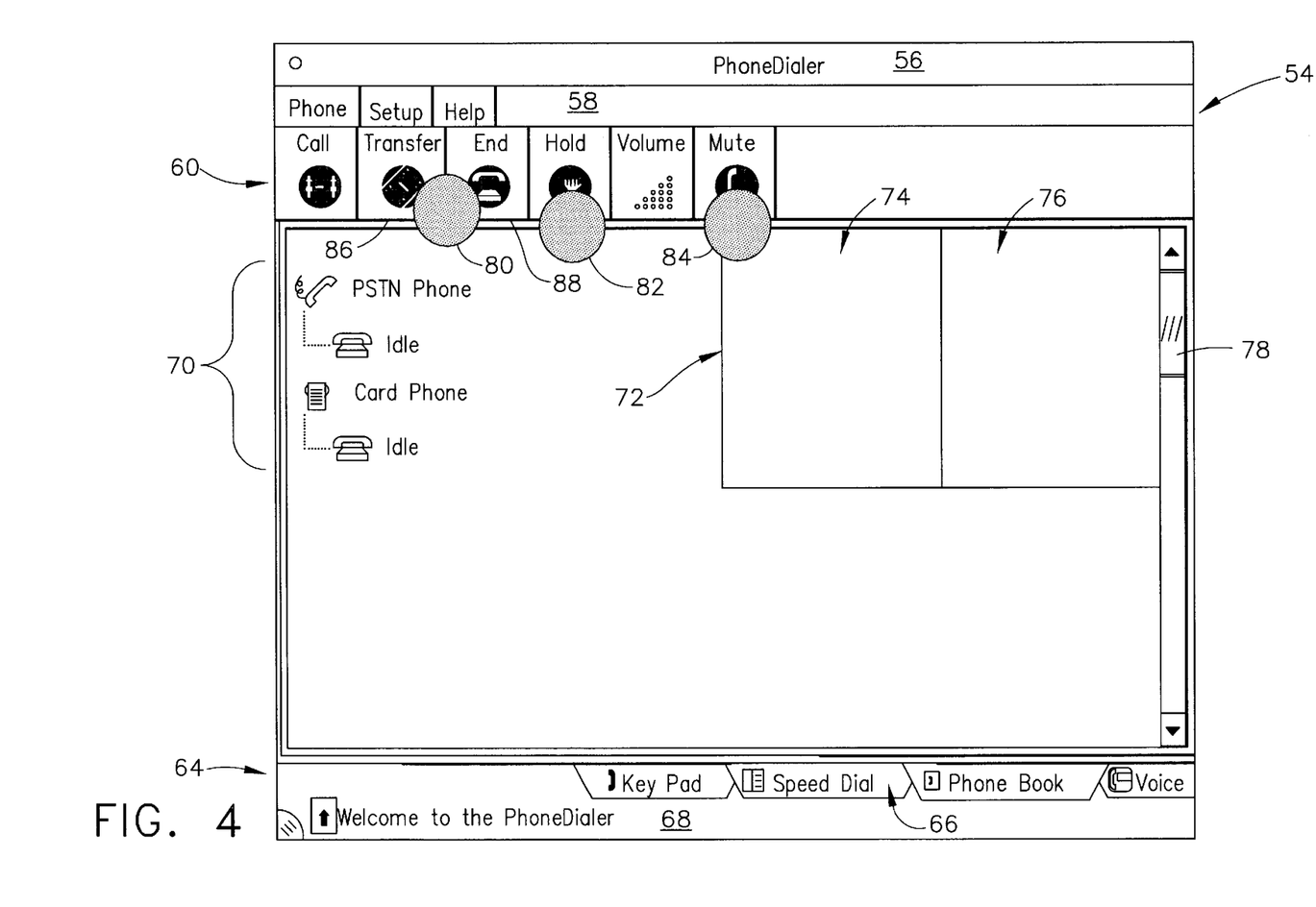
FIG. 4 is a typical screen display for a Phone Dialer software application depicting a plurality of imprecise touches with respect to the touchable items presented thereon.

FIG. 4 depicts a typical screen display 54 provided within Phone Dialer software application 52. As seen therein, screen display 54 includes a title bar 56 (i.e., "Phone Dialer") located in a top window therein, as well as a main control panel 58 including a plurality of tabbed areas which, in the representative application, are designated as "Phone," "Setup," and "Help." A second level of menu choices or control buttons 60 appear after selection of one of the tabbed areas in main control panel 58. In the representative screen display 54, control buttons 60 available under the Phone tab are denoted as "Call," "Transfer," "End," "Hold," "Volume," and "Mute," respectively. A third set of control buttons 62 appear after selection of one of second level control buttons 60. A bottom rectangular area 64 of screen display 54 includes a set of control buttons 66 denoted as "Keypad," "Speed Dial," "Phone Book" and "Voice Mail," as well as a message window 68 for displaying status information. A fourth set of command options (i.e., "PSTN Phone," "Card Phone," and separate "Idle" icons for each) is provided along the left side of screen display 54, as designated generally by numeral 70.

Screen display 54 further includes a work area 72 which is operating in a mode that depicts a split screen photo of the person initiating the call in a box 74 and the person receiving the call in a box 76. A vertical scroll bar 78 is provided for use with work area 72. It will be appreciated that each control button 58, 60, 62, and 66, as well as boxes 74 and 76 within work area 72, are touchable items for purposes of the Phone Dialer application. The term "touchable item" will be understood to mean any graphical user interface, icon, or other object depicted on touchscreen 26, such as part of screen display 54, which represents activation of a particular function by processing circuit 30.

With respect to the present invention, it will be appreciated that touchable items are activated by a touch on touchscreen 26, whether by a finger tip or stylus 28. As stated previously herein, a certain percentage of inaccuracies are to be expected from imprecise touches. By "imprecise touch," it is meant that the touch encompasses more than a prescribed area for a single touchable item. This may include more than one touchable item being encompassed by a touch or the touch encompassing a touchable item and an area not defining a particular touchable item. For example, it will be seen that a first imprecise touch is depicted by shaded area 80, a second imprecise touch is depicted by shaded area 82, and a third imprecise touch is depicted by shaded area 84.

More specifically, shaded area 80 encompasses two separate control buttons 86 ("Transfer") and 88 ("End") of second level 60. This is depicted schematically in FIG. 5, where the centerpoints of first imprecise touch 80, control button 86, and control button 88 are designated by reference numerals 90, 92 and 94, respectively. In addition, the respective areas of control buttons 86 and 88 are defined as $t_1$, and $t_2$. In order to evaluate imprecise touch 80 in accordance with the present invention, other parameters considered include the respective overlap areas 01 and 02 between control buttons 86 and 88 and first imprecise touch 80, as well as the respective distances $d_1$, and $d_2$ between the centerpoints 92 and 94 of control buttons 86 and 88 and centerpoint 90 of first imprecise touch 80.

Figure 5:
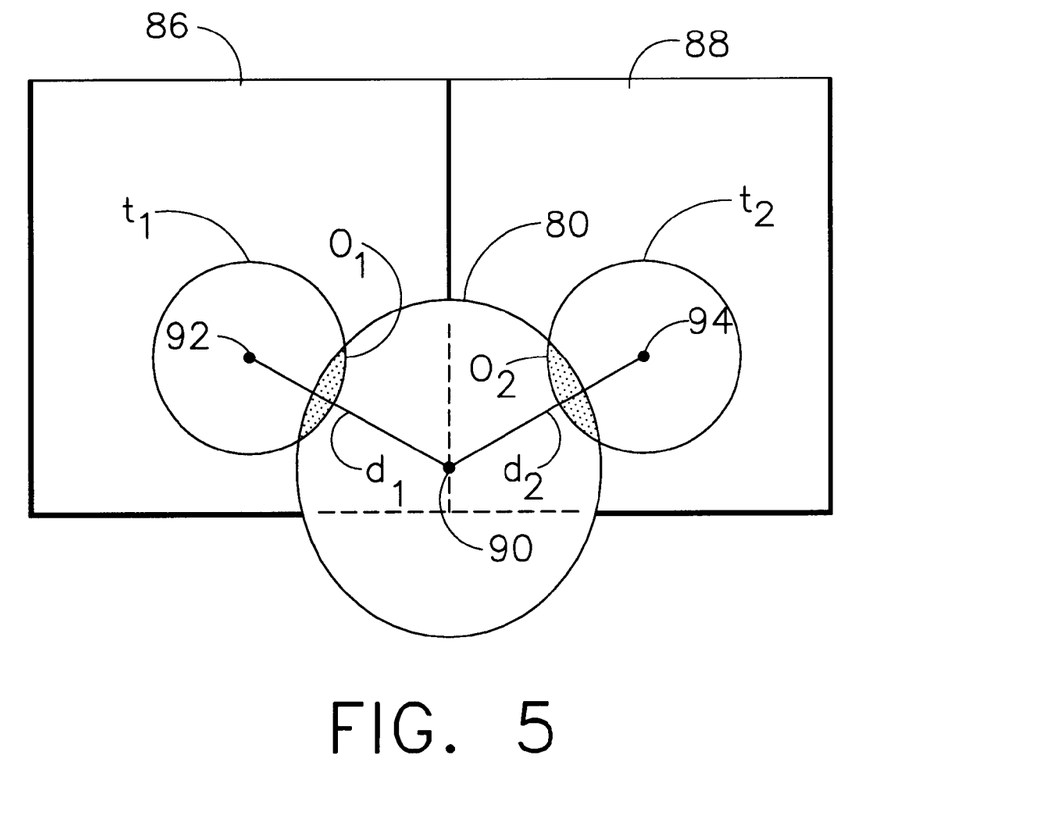
FIG. 5 is an enlarged, partial diagrammatic view of an imprecise touch as depicted in FIG. 4.

Keeping these parameters in mind, one manner for processing circuit 30 to determine which touchable item (control button 86 or control button 88) to select is a function of the overlap area o between first imprecise touch 80 and control buttons 86 and 88. In particular, it is preferred that the overlap areas $o_1$ and $o_2$ of control buttons 86 and 88 be divided by the total areas $t_1$ and $t_2$ to determine a relative overlap $r_1$ and $r_2$ for each. Thereafter, a weight w (or probability of intended selection) for each potentially selected touchable item is calculated as the relative overlap r divided by the distance d between the centerpoint of such potentially selected touchable item and the centerpoint of the imprecise touch (i.e., $r_1/d_1$ for control button 86 and $r_2/d_2$ for control button 88).

The above described method of calculating the weight w for each potentially selected touchable item includes the intuitively important aspects of overlap area o and distance d between centerpoints of the touch and the potentially selected touchable items, but requires a division to be performed for each potentially selected touchable item. An alternative method of calculating the weight w for each potentially selected touchable item avoids the division by taking advantage of the fact that as the distance d increases, the relative overlap r decreases. This stems from the observation that the regions corresponding to the touch and the potentially selected touchable items are all convex in shape. In this alternative method, weight w for each potentially selected touchable item is calculated as a square of the relative overlap area r (e.g., $(r_1)^2$ for control button 86 and $(r_2)^2$ for control button 88).

Another alternative manner of calculating weight w for each potentially selected touchable item identified by processing circuit 30 is to merely square the distance d between the centerpoint of the imprecise touch and each potentially selected touchable item (e.g., $(d_1)^2$ for control button 86 and $(d_2)^2$ for control button 88). This method likewise relies upon the fact that the relative overlap r decreases as the distance d increases.

Preferably, the weight w for each potentially selected touchable item is normalized no matter how weight w is calculated. This is accomplished by the equation $p_i = w_i / \Sigma(w_j)$. Accordingly, the normalized weights $p_1$ and $P_2$ of control buttons 86 and 88 are calculated as $w_1/(w_1+w_2)$ and $w_2/(w_1+w_2)$, respectively.

Once the weight w for each potentially selected touchable item is normalized, they are then compared to determine which has the greatest normalized weight. While the potentially selected touchable item having the greatest normalized weight may automatically be selected by processing circuit 30, with the function associated therewith then being activated, it is preferred that the weight for such potentially selected touchable item be significantly greater than the weight(s) of the other potentially selected touchable item(s) (i.e., by a predetermined amount). If this is the case, then the potentially selected touchable item having the greatest weight is selected; otherwise, no potentially selected touchable item is selected and the user is informed by touchscreen 26 that an ambiguity exists with respect to the imprecise touch.

The need for requiring a predetermined amount of difference between the potentially selected touchable item having the greatest weight and that of the other potentially selected touchable items stems from the type of functionality associated with such touchable items. A high degree of discrimination is needed in some cases since the functions involved for such potentially selected touchable items are momentous and users of portable intelligent communications device 10 may not be very forgiving about a mistake in that context. This is illustrated with respect to first imprecise touch 80, where the functions corresponding to activation of control buttons 86 and 88 involve transferring or ending a call. In the case where the relevant functions are not as risky, the required discrimination may be lower (see, e.g., second imprecise touch 82 where only one potentially selected touchable item is involved and it involves a "Hold" control button 96, a non-momentous function, and third imprecise touch 84 involving a "Mute" control button 98 and work area 72). Accordingly, the exact threshold or predetermined amount of distinction between the potentially selected touchable item having the greatest calculated weight and the other potentially selected touchable item(s) can be set based upon the specific application and the potentially selected touchable items involved in the imprecise touch determination. It will be appreciated that such predetermined amount for a touch involving potentially selected touchable items requiring a high discrimination is preferably approximately 0.35 to 0.45, while that for a touch involving potentially selected touchable items requiring only a low discrimination is preferably approximately 0.08 to 0.12.

Figure 6A:
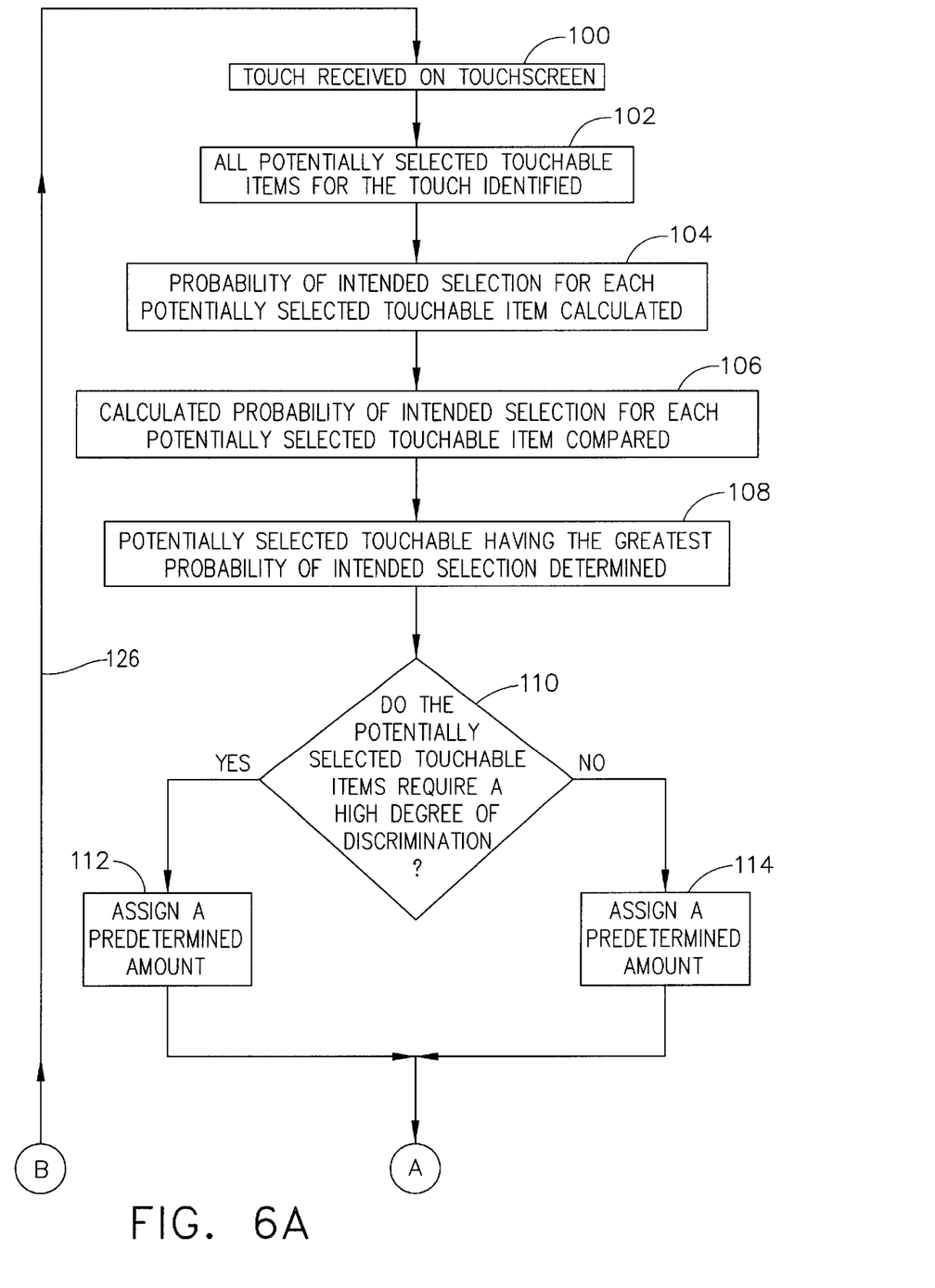
FIG. 6 is a flow chart of the steps by which the method of the present invention is accomplished.
Figure 6B:
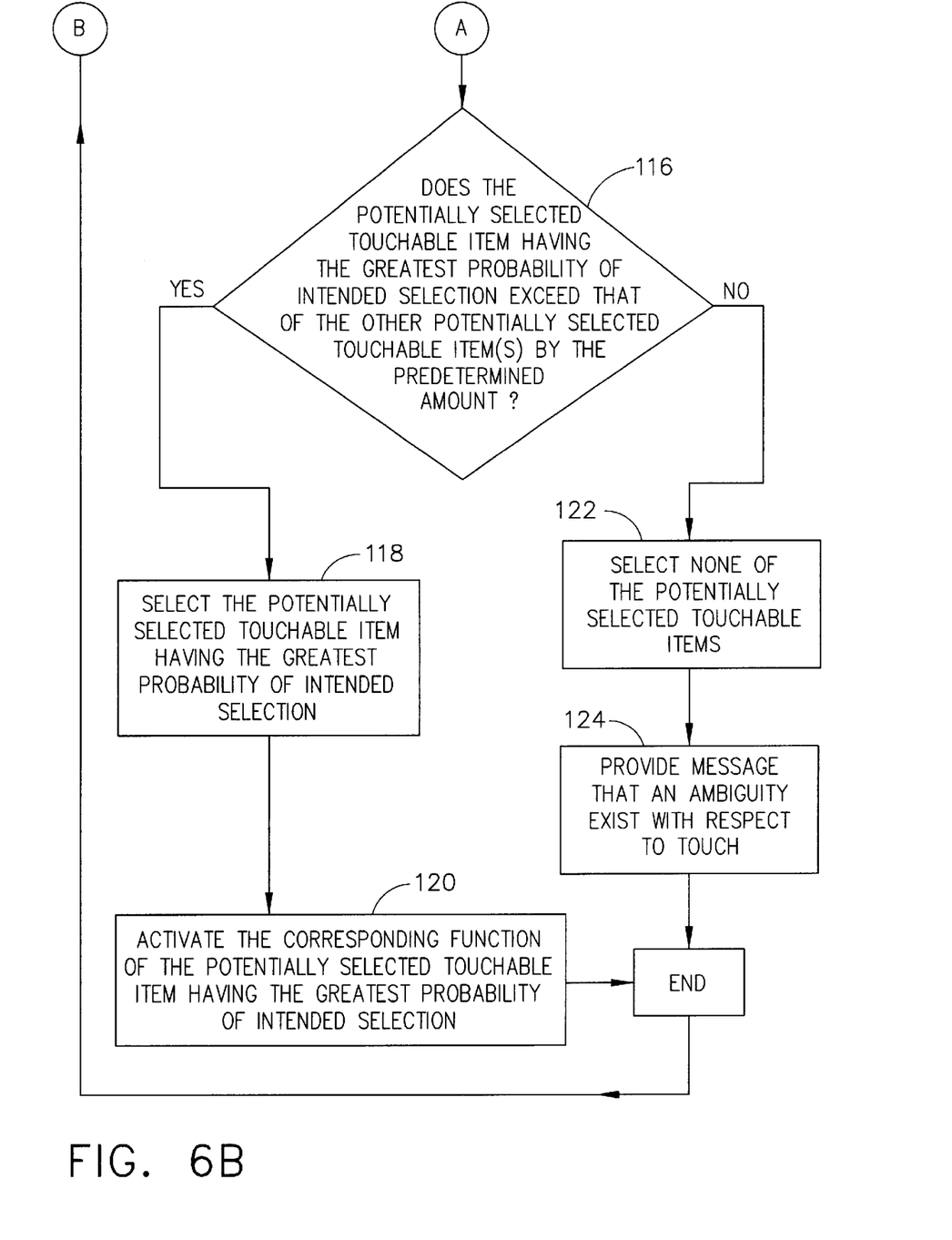

In order that the method of the present invention can be better understood, the flow diagram of FIG. 6 is provided which sets forth the pertinent steps taken by processing circuit 30 of portable intelligent communications device 10. As seen therein, box 100 represents processing circuit 30 recognizing a touch being received on touchscreen 26. Processing circuit 30 then identifies all potentially selected touchable items for such touch (box 102), which is accomplished by determining which touchable items for a given screen display overlap with the touch. Once the potentially selected touchable items have been identified, a probability of intended selection (identified hereinabove as weight w) is calculated for each potentially selected touchable item (box 104). It will be recalled that this calculation can be made by one of several different methods as a function of the relative overlap r between the touch and each potentially selected touchable item and/or the distance d between the centerpoint of such touch and each potentially selected touchable item.

The next steps, as shown in boxes 106 and 108, respectively, involve comparing the calculated probability of intended selection for each potentially selected touchable item and determining which one has the greatest weight or value. In order to take into account the type of functions associated with the potentially selected touchable items, processing circuit 30 preferably identifies whether the touchable items involved require a high degree of discrimination or not (decision box 110) and assigns a predetermined amount applicable thereto (boxes 112 and 114). Then, it is determined whether the potentially selected touchable item having the greatest probability of intended selection has a probability greater than the other potentially selected touchable item(s) by such predetermined amount assigned to the discrimination level therefor (decision box 116). If the answer is positive, then the potentially selected touchable item having the greatest probability of intended selection is selected (box 118) and the function corresponding to such selected touchable item is activated (box 120). Should the answer to decision box 116 be negative, then none of the potentially selected touchable items is selected (box 122) and a message is provided to inform the user of portable intelligent communications device 10 that an ambiguity exists with respect to the touch (box 124). The process then ends and waits for another touch to be received by touchscreen 26, as evidenced by feedback 126.

Having shown and described the preferred embodiment of the present invention, further adaptations of the apparatus and method for determining selection of touchable items on a computer touchscreen by an imprecise touch can be accomplished by appropriate modifications by one of ordinary sill in the art without departing from the scope of the invention.

What is claimed is:

1. A method of determining which touchable item depicted on a computer touchscreen to select for an imprecise touch, comprising the following steps:
   (a) identifying all potentially selected touchable items for said imprecise touch;
   (b) calculating a probability of intended selection for each said potentially selected touchable item;
   (c) comparing the calculated probability of intended selection for each said potentially selected touchable item; and
   (d) determining whether the potentially selected touchable item having the greatest calculated probability of intended selection is greater than the calculated probability of intended selection for the other potentially selected touchable items by a predetermined amount.

2. The method of claim 1, said identifying step further comprising determining which touchable items depicted on said computer touchscreen overlap with said imprecise touch.

3. The method of claim 1, said probability of intended selection being a function of a distance between a centerpoint of said imprecise touch and a centerpoint for each said potentially selected touchable item.

4. The method of claim 1, said probability calculating step being a function of an overlap area between said imprecise touch and each potentially selected touchable item.

5. The method of claim 3, said probability calculating step also being a function of an overlap area between said imprecise touch and each said potentially selected touchable item.

6. The method of claim 1, wherein the potentially selected touchable item having the greatest calculated probability of intended selection is selected when it has a value greater than the respective values for the other potentially selected touchable items by at least said predetermined amount.

7. The method of claim 6, further comprising the step of activating a function corresponding to said selected touchable item.

8. The method of claim 1, wherein no potentially selected touchable item is selected when the potentially selected touchable item having the greatest calculated probability of intended selection does not have a value greater than the respective values for the other potentially selected touchable items by said predetermined amount.

9. The method of claim 8, further comprising the step of informing a user of said computer touchscreen that an ambiguity exists with respect to said imprecise touch.

10. The method of claim 1, wherein said predetermined amount is a function of an action taken in accordance with selection of said potentially selected touchable items.

11. The method of claim 3, said probability of intended selection being a function of the square of said distance between the centerpoint of said imprecise touch and the centerpoint of each potentially selected touchable item.

12. The method of claim 3, said probability calculating step further comprising:
（a) determining a centerpoint for said imprecise touch;
(b) determining a centerpoint for each said potentially selected touchable item; and
(c) calculating a distance between said centerpoint of said imprecise touch and said centerpoint of each said potentially selected touchable item.

13. The method of claim 5, said probability calculating step further comprising:
(a) determining a total area for each potentially selected touchable item;
(b) determining an area of overlap between said imprecise touch and each said potentially selected touchable item; and
(c) determining a relative overlap between said imprecise touch and each potentially selected touchable item.

14. The method of claim 13, wherein said relative overlap is calculated by dividing the overlap area into the total area for each potentially selected touchable item.

15. The method of claim 13, further comprising the step of determining a value for each potentially selected touchable item by dividing the distance between the centerpoint of said imprecise touch and the centerpoint of each potentially selected touchable item into the relative overlap of each potentially selected touchable item.

16. The method of claim 15, further comprising the step of normalizing said value by dividing the value of each said potentially selected touchable item by the total value for all potentially selected touchable items.

17. The method of claim 16, wherein the potentially selected touchable item having the greatest normalized value is selected.

18. The method of claim 4, said probability calculating step further comprising:
(a) determining a total area for each potentially selected touchable item;
(b) determining an area of overlap between said imprecise touch and each said potentially selected touchable item; and
(c) determining a relative overlap between said imprecise touch and each potentially selected touchable item.

19. The method of claim 18, further comprising the step of squaring the relative overlap area for each said potentially selected touchable item to determine a value therefrom.

20. The method of claim 19, further comprising the step of normalizing said value by dividing the value of each potentially selected touchable item by the total value for all potentially selected touchable items.

21. The method of claim 20, wherein the potentially selected touchable item having the greatest normalized value is selected.

22. The method of claim 16, wherein the predetermined amount for a potentially selected touchable item requiring a high discrimination is approximately 0.35 to 0.45.

23. The method of claim 16, wherein the predetermined amount for a potentially selected touchable item requiring a low discrimination is approximately 0.08 to 0.12.

24. The method of claim 20, wherein the predetermined amount for a potentially selected touchable item requiring a high discrimination is approximately 0.35 to 0.45.

25. The method of claim 20, wherein the predetermined amount for a potentially selected touchable item requiring a low discrimination is approximately 0.08 to 0.12.

26. In a computer screen having a memory circuit, a processing circuit, and a touchscreen, a method of discriminating among a plurality of touchable items displayed on said touchscreen for a touch overlapping at least two said touchable items, comprising the following steps:
(a) calculating an area of overlap between said touch and each touchable item;
(b) selecting the touchable item having the greatest overlap area with said touch; and
(c) activating a function corresponding to said selected touchable item when it has an overlap area greater than the overlap areas of the other touchable items by a predetermined amount.

27. The method of claim 26, further comprising the step of informing a user of said computer touchscreen that an ambiguity exists with respect to said touch when the selected touchable item has an overlap area which is not greater than the overlap areas of the other touchable items by a predetermined amount.

28. The method of claim 26, further comprising the following steps:
(a) calculating a distance between a centerpoint of said touch and a centerpoint of each touchable item to determine a first value;
(b) calculating a relative overlap for each touchable item by dividing said area of overlap by a total area for each touchable item to determine a second value;
(c) dividing the second value by the first value for each touchable item to determine a third value; and
(d) normalizing said third value for each touchable item by dividing said third value by a total third value for all touchable items.

29. The method of claim 26, further comprising the following steps:
(a) calculating a relative overlap area for each touchable item by dividing said area of overlap by a total area for each touchable item to determine a first value;
(b) squaring said relative overlap area for each touchable item to determine a second value; and
(c) normalizing said first value for each touchable item by dividing said second value by a total value for all touchable items.

30. The method of claim 28, wherein the predetermined amount for a touchable item requiring a high discrimination is approximately 0.35 to 0.45.

31. The method of claim 28, wherein the predetermined amount for a touchable item requiring a low discrimination is approximately 0.08–0.12.

32. A portable intelligent communications device, comprising:
(a) circuitry for performing telephony operations;
(b) a memory circuit for storing a plurality of touchable items representative of certain functions of said portable intelligent communications device;
(c) a touchscreen for displaying said touchable items; and (d) a processing circuit for determining which touchable item displayed on said touchscreen to select for an imprecise touch according to a probability of intended selection for each potentially selected touchable item; wherein said processing circuit compares the calculated probability of intended selection for each said potentially selected touchable item and determines whether the potentially selected touchable item having the greatest calculated probability of intended selection is greater than the calculated probability of intended selection for the other potentially selected touchable items by a predetermined amount.

33. The portable intelligent communications device of claim 32, wherein said processing circuit identifies all potentially selected touchable items for said imprecise touch.

34. The portable intelligent communications device of claim 33, wherein said processing circuit determines which touchable items depicted on said touchscreen overlap with said imprecise touch.

35. The portable intelligent communications device of claim 32, wherein said processing circuit calculates said probability of intended selection as a function of a distance between a centerpoint of said imprecise touch and a centerpoint for each potentially selected touchable item.

36. The portable intelligent communications device of claim 32, wherein said processing circuit calculates said probability of intended selection as a function of an overlap area between said imprecise touch and each potentially selected touchable item.

37. The portable intelligent communications device of claim 35, wherein said processing circuit also calculates said probability of intended selection as a function of an overlap area between said imprecise touch and each potentially selected touchable item.

38. The method of claim 29, wherein the predetermined amount for a potentially selected touchable item requiring a high discrimination is approximately 0.35 to 0.45.

39. The method of claim 29, wherein the predetermined amount for a potentially selected touchable item requiring a low discrimination is approximately 0.08 to 0.12.

40. The portable intelligent communications device of claim 32, wherein said processing circuit selects the potentially selected touchable item having the greatest calculated probability of intended selection when it has a value greater than the respective values for the other potentially selected touchable items by at least said predetermined amount.

41. The portable intelligent communications device of claim 40, wherein said processing circuit activates a function corresponding to said selected touchable item.

42. The portable intelligent communications device of claim 32, wherein said processing circuit does not select any potentially selected touchable item when the potentially selected touchable item having the greatest calculated probability of intended selection does not have a value greater than the respective values for the other potentially selected touchable items by said predetermined amount.

43. The portable intelligent communications device of claim 42, wherein said processing circuit informs a user of said touchscreen that an ambiguity exists with respect to said imprecise touch.

44. The portable intelligent communications device of claim 32, wherein said predetermined amount is a function of an action taken in accordance with selection of said potentially selected touchable items.

45. The portable intelligent communications device of claim 35, wherein said processing circuit calculates said probability of intended selection as a function of the square of said distance between the centerpoint of said imprecise touch and the centerpoint of each potentially selected touchable item.

46. The portable intelligent communications device of claim 35, wherein said processing circuit determines a centerpoint for said imprecise touch, determines a centerpoint for each said potentially selected touchable item, and calculates a distance between said centerpoint of said imprecise touch and said centerpoint of each said potentially selected touchable item.

47. The portable intelligent communications device of claim 37, wherein said processing circuit determines a total area for each potentially selected touchable item, determines an area of overlap between said imprecise touch and each said potentially selected touchable item, and determines a relative overlap between said imprecise touch and each potentially selected touchable item.

48. The portable intelligent communications device of claim 47, wherein said processing circuit calculates said relative overlap by dividing the overlap area into the total area for each potentially selected touchable item.

49. The portable intelligent communications device of claim 47, wherein said processing circuit determines a value for each potentially selected touchable item by dividing the distance between the centerpoint of said imprecise touch and the centerpoint of each potentially selected touchable item into the relative overlap of each potentially selected touchable item.

50. The portable intelligent communications device of claim 49, wherein said processing circuit normalizes said value by dividing the value of each said potentially selected touchable item by the total value for all potentially selected touchable items.

51. The portable intelligent communications device of claim 50, wherein said processing circuit selects the potentially selected touchable item having the greatest normalized value.

52. The portable intelligent communications device of claim 36, wherein said processing circuit determines a total area for each potentially selected touchable item, determines an area of overlap between said imprecise touch and each said potentially selected touchable item, and determines a relative overlap between said imprecise touch and each potentially selected touchable item.

53. The portable intelligent communications device of claim 52, wherein said processing circuit squares the relative overlap area for each said potentially selected touchable item to determine a value therefrom.

54. The portable intelligent communications device of claim 53, wherein said processing circuit normalizes said value by dividing the value of each potentially selected touchable item by the total value for all potentially selected touchable items.

55. The portable intelligent communications device of claim 54, wherein said processing circuit selects the potentially selected touchable item having the greatest normalized value.

56. The portable intelligent communications device of claim 50, wherein the predetermined amount for a potentially selected touchable item requiring a high discrimination is approximately 0.35 to 0.45.

57. The portable intelligent communications device of claim 50, wherein the predetermined amount for a potentially selected touchable item requiring a low discrimination is approximately 0.08 to 0.12.

58. The method of claim 54, wherein the predetermined amount for a potentially selected touchable item requiring a high discrimination is approximately 0.35 to 0.45.

59. The method of claim 54, wherein the predetermined amount for a potentially selected touchable item requiring a low discrimination is approximately 0.08 to 0.12.

* * * * *